(12) United States Patent
Sedukhin et al.

(10) Patent No.: US 8,024,396 B2
(45) Date of Patent: Sep. 20, 2011

(54) DISTRIBUTED BEHAVIOR CONTROLLED EXECUTION OF MODELED APPLICATIONS

(75) Inventors: Igor Sedukhin, Issaquah, WA (US); Daniel Eshner, Issaquah, WA (US); Steve Swartz, Snohomish, WA (US); Udaya Kumar Bhaskara, Redmond, WA (US); Nagalinga Durga Prasad Sripathi Panditharadhya, Sammamish, WA (US); Amol Sudhakar Kulkarni, Bothell, WA (US); Haoran Andy Wu, Sammamish, WA (US); Mariusz Gerard Borsa, Redmond, WA (US); Michael Oliver Neary, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 438 days.

(21) Appl. No.: 11/740,737

(22) Filed: Apr. 26, 2007

(65) Prior Publication Data

US 2008/0270411 A1    Oct. 30, 2008

(51) Int. Cl.
*G06F 15/173* (2006.01)
(52) U.S. Cl. .......... 709/201; 709/223; 709/224; 707/10; 718/100
(58) Field of Classification Search .................. 709/201, 709/224, 243; 707/10; 718/100
See application file for complete search history.

(56) References Cited

U.S. PATENT DOCUMENTS

| | | |
|---|---|---|
| 4,751,635 A | 6/1988 | Kret |
| 5,423,003 A | 6/1995 | Berteau |
| 5,602,991 A | 2/1997 | Berteau |
| 5,655,081 A | 8/1997 | Bonnell |
| 5,764,241 A | 6/1998 | Elliott |
| 5,809,266 A | 9/1998 | Touma |
| 5,893,083 A | 4/1999 | Eshghi |
| 5,913,062 A | 6/1999 | Vrvilo et al. |
| 5,937,388 A | 8/1999 | Davis et al. |
| 5,958,010 A | 9/1999 | Agarwal |
| 6,005,849 A | 12/1999 | Roach et al. |
| 6,026,404 A | 2/2000 | Adunuthula |
| 6,055,363 A | 4/2000 | Beals et al. |

(Continued)

FOREIGN PATENT DOCUMENTS

EP    1770510    4/2007

(Continued)

OTHER PUBLICATIONS

U.S. Appl. No. 12/105,083, filed Apr. 17, 2008 (Not Yet Published).

(Continued)

*Primary Examiner* — Thuong T Nguyen
(74) *Attorney, Agent, or Firm* — Workman Nydegger (57) ABSTRACT

The present invention extends to methods, systems, and computer program products for distributed behavior controlled execution of modeled applications. Embodiments of the invention facilitate the interoperation of a central data store along with various peer-to-peer functionalities. Thus, distributed applications can be executed in an environment that utilizes advantages of both a central data store and peer-to-peer messaging. A read-only portion of a centralized data store can be used to provide some behavior control over various processing systems during execution of a distributed software application. Thus, embodiments of the invention can be used to form a policy-driven collective of nodes forming a distributed, decentralized run-time for model-based applications. Utilizing a cooperating collective of nodes that comply with centralized polices and execute applications over a peer-to-peer fabric permits a distributed application runtime to accommodate distribution and decentralization on a large scale.

12 Claims, 3 Drawing Sheets

U.S. PATENT DOCUMENTS

| | | | |
|---|---|---|---|
| 6,070,190 A | 5/2000 | Reps | |
| 6,167,538 A | 12/2000 | Neufeld et al. | |
| 6,225,995 B1 | 5/2001 | Jacobs | |
| 6,247,056 B1 | 6/2001 | Chou | |
| 6,263,339 B1 | 7/2001 | Hirsch | |
| 6,279,009 B1 | 8/2001 | Smirnov et al. | |
| 6,330,717 B1 | 12/2001 | Raverdy | |
| 6,334,114 B1 | 12/2001 | Jacobs | |
| 6,336,217 B1 | 1/2002 | D'Anjou et al. | |
| 6,415,297 B1 | 7/2002 | Leymann et al. | |
| 6,477,665 B1 | 11/2002 | Bowman-Amuah | |
| 6,618,719 B1 | 9/2003 | Andrei | |
| 6,640,241 B1 | 10/2003 | Ozzie et al. | |
| 6,654,783 B1 | 11/2003 | Hubbard | |
| 6,662,205 B1 | 12/2003 | Bereiter | |
| 6,697,877 B1 | 2/2004 | Martin | |
| 6,710,786 B1 | 3/2004 | Jacobs | |
| 6,715,145 B1 | 3/2004 | Bowman-Amuah | |
| 6,718,535 B1 | 4/2004 | Underwood | |
| 6,801,818 B2 | 10/2004 | Kopcha | |
| 6,847,970 B2 | 1/2005 | Keller et al. | |
| 6,854,069 B2 | 2/2005 | Kampe | |
| 6,886,024 B1 | 4/2005 | Fujita | |
| 6,907,395 B1 | 6/2005 | Hunt et al. | |
| 6,931,644 B2 | 8/2005 | Riosa | |
| 6,934,702 B2 * | 8/2005 | Faybishenko et al. | 707/3 |
| 6,941,341 B2 | 9/2005 | Logston | |
| 7,051,098 B2 | 5/2006 | Masters | |
| 7,055,143 B2 | 5/2006 | Ringseth et al. | |
| 7,065,579 B2 * | 6/2006 | Traversat et al. | 709/230 |
| 7,072,807 B2 | 7/2006 | Brown | |
| 7,072,934 B2 | 7/2006 | Helgeson | |
| 7,079,010 B2 | 7/2006 | Champlin | |
| 7,085,837 B2 | 8/2006 | Kimbrel | |
| 7,096,258 B2 | 8/2006 | Hunt et al. | |
| 7,103,874 B2 | 9/2006 | McCollum | |
| 7,130,881 B2 | 10/2006 | Volkov et al. | |
| 7,150,015 B2 | 12/2006 | Pace et al. | |
| 7,155,380 B2 | 12/2006 | Hunt | |
| 7,155,466 B2 | 12/2006 | Rodriguez et al. | |
| 7,162,509 B2 | 1/2007 | Brown et al. | |
| 7,168,077 B2 | 1/2007 | Kim | |
| 7,174,359 B1 | 2/2007 | Hamilton, II et al. | |
| 7,178,129 B2 * | 2/2007 | Katz | 717/108 |
| 7,200,530 B2 | 4/2007 | Brown | |
| 7,219,351 B2 | 5/2007 | Bussler et al. | |
| 7,263,689 B1 | 8/2007 | Edwards et al. | |
| 7,379,999 B1 | 5/2008 | Zhou et al. | |
| 7,512,707 B1 | 3/2009 | Manapragada | |
| 7,796,520 B2 * | 9/2010 | Poustchi et al. | 370/236 |
| 7,797,289 B2 | 9/2010 | Chan et al. | |
| 2002/0035593 A1 | 3/2002 | Salim et al. | |
| 2002/0038217 A1 | 3/2002 | Young | |
| 2002/0099818 A1 | 7/2002 | Russell | |
| 2002/0111841 A1 | 8/2002 | Leymann | |
| 2002/0120917 A1 | 8/2002 | Abrari et al. | |
| 2002/0133504 A1 | 9/2002 | Vlahos et al. | |
| 2002/0135611 A1 | 9/2002 | Deosaran | |
| 2002/0147515 A1 | 10/2002 | Fava et al. | |
| 2002/0147962 A1 | 10/2002 | Hatanaka | |
| 2002/0198734 A1 | 12/2002 | Greene et al. | |
| 2003/0005411 A1 | 1/2003 | Gerken | |
| 2003/0061342 A1 | 3/2003 | Abdelhadi | |
| 2003/0084156 A1 | 5/2003 | Graupner et al. | |
| 2003/0135384 A1 | 7/2003 | Nguyen | |
| 2003/0149685 A1 | 8/2003 | Trossman et al. | |
| 2003/0195763 A1 | 10/2003 | Gulcu | |
| 2004/0034850 A1 | 2/2004 | Burkhardt | |
| 2004/0046785 A1 | 3/2004 | Keller | |
| 2004/0078461 A1 | 4/2004 | Bendich et al. | |
| 2004/0088350 A1 | 5/2004 | Early | |
| 2004/0102926 A1 | 5/2004 | Adendorff | |
| 2004/0148184 A1 | 7/2004 | Sadiq | |
| 2004/0162901 A1 | 8/2004 | Mangipudi | |
| 2004/0249972 A1 * | 12/2004 | White et al. | 709/243 |
| 2005/0005200 A1 | 1/2005 | Matena et al. | |
| 2005/0011214 A1 | 2/2005 | Schwetfuehrer | |
| 2005/0055692 A1 | 3/2005 | Lupini et al. | |
| 2005/0071737 A1 | 3/2005 | Adendorff | |
| 2005/0074003 A1 * | 4/2005 | Ball et al. | 370/389 |
| 2005/0091227 A1 | 4/2005 | McCollum et al. | |
| 2005/0120106 A1 * | 6/2005 | Albertao | 709/223 |
| 2005/0125212 A1 | 6/2005 | Hunt et al. | |
| 2005/0132041 A1 | 6/2005 | Kundu | |
| 2005/0137839 A1 | 6/2005 | Mansurov | |
| 2005/0155042 A1 * | 7/2005 | Kolb et al. | 719/318 |
| 2005/0165906 A1 | 7/2005 | Deo et al. | |
| 2005/0188075 A1 | 8/2005 | Dias | |
| 2005/0216831 A1 | 9/2005 | Guzik | |
| 2005/0261875 A1 | 11/2005 | Shrivastava | |
| 2005/0268307 A1 * | 12/2005 | Gates et al. | 719/315 |
| 2005/0278702 A1 | 12/2005 | Koyfman | |
| 2005/0283518 A1 | 12/2005 | Sargent | |
| 2006/0010142 A1 | 1/2006 | Kim | |
| 2006/0010164 A1 | 1/2006 | Netz | |
| 2006/0013252 A1 | 1/2006 | Smith | |
| 2006/0036743 A1 | 2/2006 | Deng | |
| 2006/0064460 A1 | 3/2006 | Sugawara | |
| 2006/0070066 A1 * | 3/2006 | Grobman | 718/1 |
| 2006/0070086 A1 | 3/2006 | Wang | |
| 2006/0074730 A1 | 4/2006 | Shukla et al. | |
| 2006/0074734 A1 | 4/2006 | Shukla | |
| 2006/0095443 A1 | 5/2006 | Kumar | |
| 2006/0123389 A1 | 6/2006 | Kolawa et al. | |
| 2006/0123412 A1 | 6/2006 | Hunt | |
| 2006/0155738 A1 | 7/2006 | Baldwin | |
| 2006/0173906 A1 | 8/2006 | Chu et al. | |
| 2006/0206537 A1 | 9/2006 | Chiang | |
| 2006/0230314 A1 | 10/2006 | Sanjar | |
| 2006/0235859 A1 | 10/2006 | Hardwick | |
| 2006/0236254 A1 | 10/2006 | Mateescu | |
| 2006/0265231 A1 | 11/2006 | Fusaro et al. | |
| 2006/0277323 A1 | 12/2006 | Joublin | |
| 2006/0277437 A1 | 12/2006 | Ohtsuka | |
| 2006/0294506 A1 | 12/2006 | Dengler | |
| 2007/0005283 A1 | 1/2007 | Blouin | |
| 2007/0005299 A1 | 1/2007 | Haggerty | |
| 2007/0006122 A1 | 1/2007 | Bailey et al. | |
| 2007/0016615 A1 | 1/2007 | Mohan et al. | |
| 2007/0033088 A1 | 2/2007 | Aigner et al. | |
| 2007/0050237 A1 | 3/2007 | Tien | |
| 2007/0050483 A1 | 3/2007 | Bauer et al. | |
| 2007/0061776 A1 | 3/2007 | Ryan et al. | |
| 2007/0067266 A1 | 3/2007 | Lomet | |
| 2007/0088724 A1 | 4/2007 | Demiroski | |
| 2007/0089117 A1 | 4/2007 | Samson | |
| 2007/0094350 A1 | 4/2007 | Moore | |
| 2007/0112847 A1 | 5/2007 | Dublish | |
| 2007/0174228 A1 | 7/2007 | Folting | |
| 2007/0174815 A1 | 7/2007 | Chrysanthakopoulos et al. | |
| 2007/0179823 A1 | 8/2007 | Bhaskaran | |
| 2007/0208606 A1 | 9/2007 | MacKay | |
| 2007/0220177 A1 | 9/2007 | Kothari | |
| 2007/0233879 A1 * | 10/2007 | Woods et al. | 709/227 |
| 2007/0244904 A1 | 10/2007 | Durski | |
| 2007/0245004 A1 * | 10/2007 | Chess et al. | 709/223 |
| 2007/0277109 A1 | 11/2007 | Chen | |
| 2008/0005729 A1 * | 1/2008 | Harvey et al. | 717/155 |
| 2008/0010631 A1 * | 1/2008 | Harvey et al. | 717/131 |
| 2008/0209414 A1 * | 8/2008 | Stein | 717/173 |
| 2008/0244423 A1 | 10/2008 | Jensen-Pistorius | |
| 2009/0049165 A1 | 2/2009 | Long et al. | |
| 2009/0187662 A1 | 7/2009 | Manapragada et al. | |
| 2009/0197662 A1 | 8/2009 | Manapragada | |
| 2009/0265458 A1 | 10/2009 | Baker | |
| 2010/0005527 A1 | 1/2010 | Jeon | |

FOREIGN PATENT DOCUMENTS

| | | |
|---|---|---|
| WO | 0124003 | 4/2001 |
| WO | WO 02/27426 A2 | 4/2002 |
| WO | WO9227426 | 4/2002 |
| WO | 2007072501 | 6/2007 |

OTHER PUBLICATIONS

Frecon, Emmanuel, et al., "DIVE: a scaleable network architecture for distributed virtual environments", The British Computer Society, The Institution of Electrical Engineers and IOP Publishing Ltd, Mar. 6, 1998, pp. 91-100.
Baldi, Mario, et al., "Exploiting Code Mobility in Decentralized and Flexible Network Management", Lecture Notes in Computer Science, vol. 1219, Proceedings of the First International Workshop on Mobile Agents, pp. 13-26.
Milenkovic, Milan, et al., "Towards Internet Distributed Computing," Sep. 26, 2003, http://m.students.umkc.edu/mpshxf/Towards_IDC.pdf.
U.S. Appl. No. 11/844,177, filed Aug. 23, 2007, Sedhukin.
U.S. Appl. No. 11/771,827, filed Jun. 29, 2007, Sedhukin.
U.S. Appl. No. 11/771,816, filed Jun. 29, 2007, Sedhukin.
"Managing Complexity in Middleware", by Adrian Colyer, Gordon Blair and Awais Rashid, IBM UK Limited, Hursley Park, Winchester, England and Computing Department, Lancaster University, Bailrigg, Lancaster, England, [online] [retrieved on Apr. 20, 2007], 6 pgs. Retrieved from the Internet: http://222.aosd.net/2005/workshops/acp4is/past/asp4is03/papers/colyer.pdf.
"User Interface Declarative Models and Development Environments: A Survey", by Paulo Pinheiro Da Silva, Department of Computer Science, University of Manchester, Manchester, England [online] [retrieved on Apr. 20, 2007], 20 pgs. Retrieved from the Internet: http://www.cs.utep.edu/paulo/papers/PinheirodaSilva_DSVIS_2000.pdf.
"Architecturing and Configuring Distributed Application with Olan", by R. Balter, L. Bellissard, F. Boyer, M Riveill and J.Y. Vion-Dury, Middleware 98 Conference Report, INRIA, France, [online] [retrieved on Apr. 20, 2007], 15 pages. Retrieved from the Internet: http://www.comp.lancs.ac.uk/computing/middleware98/papers.html.
"A Load Balancing Module for the Apache Web Server", Author Unknown, [online] [retrieved on Apr. 20, 2007], 9 pgs. Retrived from the Internet: http://www.backhand.org/ApacheCon2000/US/mod_backhand_coursenotes.pdf.
"Performance Tuning and Optimization of J2ee Applications on the Jboss Platfom", by Samuel Kounev, Bjorn Weis and Alejandro Duchmann, Department of Computer Science, Darmstadt University of Technology, Germany, [online] [retrieved on Apr. 20, 2007], 10 pgs. Retrieved from the Internet: http://www.cl.cam.ac.uk/~sk507/pub/04-cmg-JBoss.pdf.
"Outlier Detection for Fine-Grained Load Balancing in Database Clusters", by Jin Chen, Gokul Soundararajan, Madalin Mihailescu and Cristiana Amza, Department of Computer Science, Department of Electrical and Computer Engineering, University of Toronto, [online] [retrieved on Apr. 20, 2007], 10 pgs. Retrieved from the Internet: http://www.cs.toronto.edu/~jinchen/papers/smdb07.pdf.
Dias, M. Bernardine, et al., "A Real-Time Rover Executive Based on Model-Based Reactive Planning" The 7th International Symposium on Artificial Intelligence, Robotics and Automation in Space, May 2003.
Goble, Carole, et al., "Building Large-scale, Service-Oriented Distributed Systems using Semantic Models", http://www.jisc.ac.uk/media/documents/programmes/capital/grid_standards_above_ogsa.pdf, 21 pages.
Robinson, William N., "Implementing Rule-based Monitors within a Framework for continuous Requirements Monitoring" Proceedings of the 38th Hawaii International Conference on System Sciences, 2005 IEEE, 10 pages.
Maghraoui, Kaoutar El, et al., "Model Driven Provisionings: Bridging the Gap Between Declarative Object Models and Procedural Provisioning Tools", http://wcl.cs.rpi.edu/papers/middleware06.pdf.
U.S. Appl. No. 11/925,079, filed Oct. 26, 2007, Bhaskar.
U.S. Appl. No. 11/925,326, filed Oct. 26, 2007, Christensen.
U.S. Appl. No. 11/925,680, filed Oct. 26, 2007, Sedukhin.
U.S. Appl. No. 11/925,591, filed Oct. 26, 2007, Sedukhin.
U.S. Appl. No. 11/925,067, filed Oct. 26, 2007, Sedukhin.
U.S. Appl. No. 11/925,184, filed Oct. 26, 2007, Voss.
U.S. Appl. No. 11/925,201, filed Oct. 26, 2007, Sedukhin.
U.S. Appl. No. 60/983,117, filed Oct. 26, 2007, Skierkowski.

OSLO>Suite 2006, "OSLO Suite is the leading platform for designing, building and exeucting adaptive business solutions", http://www.oslo-software.com/en/product.php.
Korb, John T., et al., "Command Execution in a Heterogeneous Environment", 1986 ACM, pp. 68-74.
Von, Vorgelet, et al., "Dynamic Upgrade of Distributed Software Components", 2004, 191 pages.
Poslad, Stefan, et al., "The FIPA-OS agent platform: Open Source for Open Standards", Apr. 2000, 17 pages.
Software News, "Progress Software Extends Lead in Distributed SOA" 2007, 6 pages.
Eidson, Thomas M., "A Component-based Programming Model for Composite, Distributed Applications", Institute for Computer Applications in Science and Engineering Hampton, VA, May 2001, 1 page.
Bauer, Michael A., "Managing Distributed Applications and Systems: An Architectural Experiment", Jan. 31, 1997, 46 pages.
Tawfik, Sam, "Composite applications and the Teradata EDW", Extend the capabilities of your enterprise data warehouse with supporting applications, Teradata Magazine online, Archive: vol. 6, No. 4, Dec. 2006, 3 pages.
Alpern, Bowen, et al, "PDS: A Virtual Execution Environment for software Deployment", 2005, pp. 175-185.
Talcott, Carolyn L., MTCoord 2005 Preliminary Version, "Coordination Models Based on a Formal Model of Distributed Object Reflection", 13 pages.
Leymann, F., et al., "Web Services and Business Process Management", IBM Systems Journal, vol. 41, No. 2, 2002, New Developments in Web Services and E-commerce, 11 pages.
Ivan, A.-A, et al., "Partionable services: A framework for seamlessly adapting distributed applications to heterogeneous environements", High Performance Distributed Computing, 2002. HPDC-11 2002. Proceedings. 11th IEEE International Symposium, 1 page.
Urban, Susan D., et al., "Active Declarative Integration Rules for Developing Distributed Multi-Tiered Applications", 3 pages.
Bischoff, Urs, et al., "Programming the Ubiquitous Network: A Top-Down Approach" System Support for Ubiquitous Computing Workshop (UbiSys'06), Orange County, USA, Sep. 2006, 8 pages.
Albrecht, Jeannie, et al., "Remote Control: Distributed Application Configuration Management, and Visualization with Plush", Proceedings of the Twenty-first USENIX Large Installation System Administration Conference (LISA), Nov. 2007, 16 pages.
"Factal:Edge Enlists CMLgroup to Bring Visualization to Business Performance Management Clients", http://extranet.fractaledge.com/News/PressReleases/2006/060829, 2006, 2 pages.
Office Action dated Oct. 14, 2009 cited in U.S. Appl. No. 11/771,827.
Office Action dated Oct. 1, 2009 cited in U.S. Appl. No. 11/771,816.
Nastel Technologies, Inc., "AutoPilot Business Dashboard Configuration and User's Guide Version 4.4", 2006, AP/DSB 440.001, 82 pages.
TIBCO The Power of Now, "TIBCO BusinessFactor", 2006, 2 pages.
TIBCO, http://wvvw.tibco.com/software/business_activity_monitoring/businessfactor/default.jsp, Copyright 2000-2007, 2 pages.
Office Action dated Mar. 2, 2010 cited in U.S. Appl. No. 11/771,816.
Office Action dated Apr. 5, 2010 cited in U.S. Appl. No. 11/771,827.
Office Action dated Apr. 13, 2010 cited in U.S. Appl. No. 11/925,326.
U.S. Appl. No. 11/925,326, mail date Jul. 22, 2010, Notice of Allowance.
U.S. Appl. No. 11/925,184, mail date Jan. 14, 2011, Office Action.
U.S. Appl. No. 11/925,079, mail date Sep. 1, 2010, Office Action.
Shaojie Wang, Synthesizing Operating System Based Device Drivers in Embedded Systems, 2003.
U.S. Appl. No. 11/771,827, mail date Nov. 29, 2010, Notice of Allowance.
U.S. Appl. No. 11/925,067, mail date Dec. 6, 2010, Notice of Allowance.
U.S. Appl. No. 11/925,079, mail date Mar. 1, 2011, Notice of Allowance.

* cited by examiner

DISTRIBUTED BEHAVIOR CONTROLLED EXECUTION OF MODELED APPLICATIONS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

Various different network architectures can be utilized to permit computer systems to interact with one another. Network architectures can be classified to some extent according to the functional relationships that exist between computer systems of the network architecture. For example, network architectures can be classified as client-server architectures, peer-to-peer architectures, etc.

A client-server architecture separates client and server functionalities between different computer systems. The purpose of different client-server architectures may vary and/or be applied in a variety of ways. However generally, the relationships between computer systems within a client-server architecture are very similar across all client-server architectures. Typically a plurality of client computer systems is configured to send requests (e.g., for data) to a server computer system (or in some environments a server farm). The server computer system (or sever farm) receives and processes requests (e.g., accessing requested data) and sends an appropriate response (e.g., requested data) back to a client.

One common client-server relationship is that of the World Wide Web ("WWW"). Web servers (the servers) maintain and control access to content (e.g., Web pages) that can be requested from Web browsers (the clients) over the Internet.

Client-server architectures are advantageous for a number of reasons, due primarily to data being stored at a central location. For example, since data is stored at a central location security and access control with respect to the data can be more easily implemented. Further, since there is a clear divide between the functionality of a client and a server, a client can be easily upgrade without impacting operation of the server and vice versa.

Unfortunately, client-server architectures also have some number of disadvantages. One primary disadvantage is a lack of robustness, which also results from data being stored in a central location. That is, if a server malfunctions, there may be no way to fulfill client requests. Servers can also suffer from traffic congestion, when a number of received requests is so large that it overloads server resources. Further, the resources for establishing a server in many environments typically exceeds the resources of most home computer systems, thereby preventing many users from being able to create a server.

Peer-to-peer network architectures do not have the notion of servers and clients. Each computer system in a peer-to-peer network is viewed as an equal peer node. Thus, peer-to-peer network architectures rely on the computing power and bandwidth of all the computer systems on the network, as opposed to concentrating resources in a small number of servers (or even in a single server). Peer-to-peer network architectures are often used to connect computer systems together to form ad hoc networks, such as, for example, to share files or exchange real-time data.

Peer-to-peer network architectures are advantageous for a number of reasons, primarily due to resources being shared among computer systems. For example, when a new computer system joins a peer-to-peer network, the resource capacity of the network is increased, since the resources of the joining computer are available for use by other computer systems on the peer-to-peer network. In contrast, resource capacity in a client-server network does not increase when a new client sends a request to a server. Further, since resources are shared among computer systems, peer-to-peer networks are typically more robust than client-server networks. That is, if one computer system with access to data fails, there is some likelihood that one or more other computer systems also have access to the same data.

However, peer-to-peer networks also have a variety of disadvantages. Since each computer system is viewed equally, it can be difficult for any one computer system control the behavior of other computer systems, such as, for example, to implement access control or other security measures. This lack of central control makes peer-to-peer networks significantly more vulnerable to malicious attacks (e.g., poisoning attacks, polluting attacks, denial-of-service attacks, spamming etc.) than client-server networks.

Further there is essentially no restriction on when a computer system can join or leave a peer-to-peer network. Thus, to maintain robustness with respect to requestable data, the same portion of data may be transferred from computer system to computer system across a network (e.g., the Internet) multiple times. For example, when a computer system leaves a peer-to-peer network it can transfer requestable data to another computer system so that the requestable data remains available. Accordingly, each time a computer system leaves a peer-to-peer network, some portion of data is (potentially for a second, third, etc., time) transferred to a remaining computer system.

Enterprise software has typically been developed for use in client-server network architectures (and thus suffers from the problems inherent to client-server architectures). Enterprise software is often proprietary software used to automate business processes, such as, for example, accounting, sales, etc. As such, the companies that develop enterprise software typically desire the enterprise software to be controlled for use in their corporate environment. Enterprise software is frequently very complex and not well adapted for use outside of the intended operating environment. Accordingly, enterprise software is often prevented from operating in a Web based environment and thus, from taking advantage of the simplicity and dynamisms of the Worldwide Web ("WWW").

Somewhat conversely, Web based applications can view the entire Internet as a single (but uncontrolled) data center and can easily access data from locations through out the WWW. Based on accessed data, Web based applications can easily be remixed and run with new settings to facilitate changing developer desires. However, since data is made accessible to and from a variety of potentially uncontrolled locations, rapidly developed and remixed Web based applications (to some extent suffer from the problems inherent to peer-to-peer architectures and) often have an undesirable low level of associated security and reliability.

BRIEF SUMMARY

The present invention extends to methods, systems, and computer program products for distributed behavior controlled execution of modeled applications. Embodiments of the invention include a system configured to execute distributed software applications. The system includes a plurality of processing systems. Configurable distributed logic for executing distributed software applications is distributed across the plurality of processing systems.

A data stored is connected to and shared among the distributed logic. The data store includes read-only data and read-write data. The read-only data prescribes the behavior of the distributed logic when executing a distributed software application. The plurality of processing systems use the read-write data to store and share distributed software application data when executing a distributed software application.

A message infrastructure is connected to and shared among the distributed logic. The message infrastructure is configured to exchange messages among processing systems to a) discover the presence of configurable distributed logic at processing systems for use in executing distributed software applications and b) coordinate processing systems to implement the behavior prescribed in the read-only data when executing a distributed software application.

In some embodiments, a distributed processing system executes a model-based distributed software application. The distributed processing system includes a group of cooperative executive services collectively representing a distributed application runtime. An executive service of the distribute runtime receives a command to execute a model-based software application stored in a read-only portion of a common data repository. The executive service discovers other executive services of the distributed runtime via a specified kind of messaging infrastructure identified as service bus. Service bus allows executive services to signal each other. The executive service and the other executive services cooperatively group together to provide distributed logic for executing the model-based software application.

The group of executive services coordinates via the service bus to execute the model-based software application in accordance with the policies stored in the read-only portion of the common data repository. Executing the model-based software application includes: a) using the read-write portion of the common data repository to reflect the state of the model-based software application and b) using the read-write portion of the common data repository to reflect operational data corresponding to the model-based software application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for distributed behavior controlled execution of modeled applications. Embodiments of the invention include a system configured to execute distributed software applications. The system includes a plurality of processing systems. Configurable distributed logic for executing distributed software applications is distributed across the plurality of processing systems.

A data stored is connected to and shared among the distributed logic. The data store includes read-only data and read-write data. The read-only data prescribes the behavior of the distributed logic when executing a distributed software application. The plurality of processing systems use the read-write data to store and share distributed software application data when executing a distributed software application.

A message infrastructure is connected to and shared among the distributed logic. The message infrastructure is configured to exchange messages among processing systems to a) discover the presence of configurable distributed logic at processing systems for use in executing distributed software applications and b) coordinate processing systems to implement the behavior prescribed in the read-only data when executing a distributed software application.

In some embodiments, a distributed processing system executes a model-based distributed software application. The distributed processing system includes a group of cooperative executive services collectively representing a distributed application runtime. An executive service of the distribute runtime receives a command to execute a model-based software application stored in a read-only portion of a common data repository. The executive service discovers other executive services of the distributed runtime via a specified kind of messaging infrastructure identified as service bus. Service bus allows executive services to signal each other. The executive service and the other executive services cooperatively group together to provide distributed logic for executing the model-based software application.

The group of executive services coordinates via the service bus to execute the model-based software application in accordance with the policies stored in the read-only portion of the common data repository. Executing the model-based software application includes: a) using the read-write portion of the common data repository to reflect the state of the model-based software application and b) using the read-write portion of the common data repository to reflect operational data corresponding to the model-based software application.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
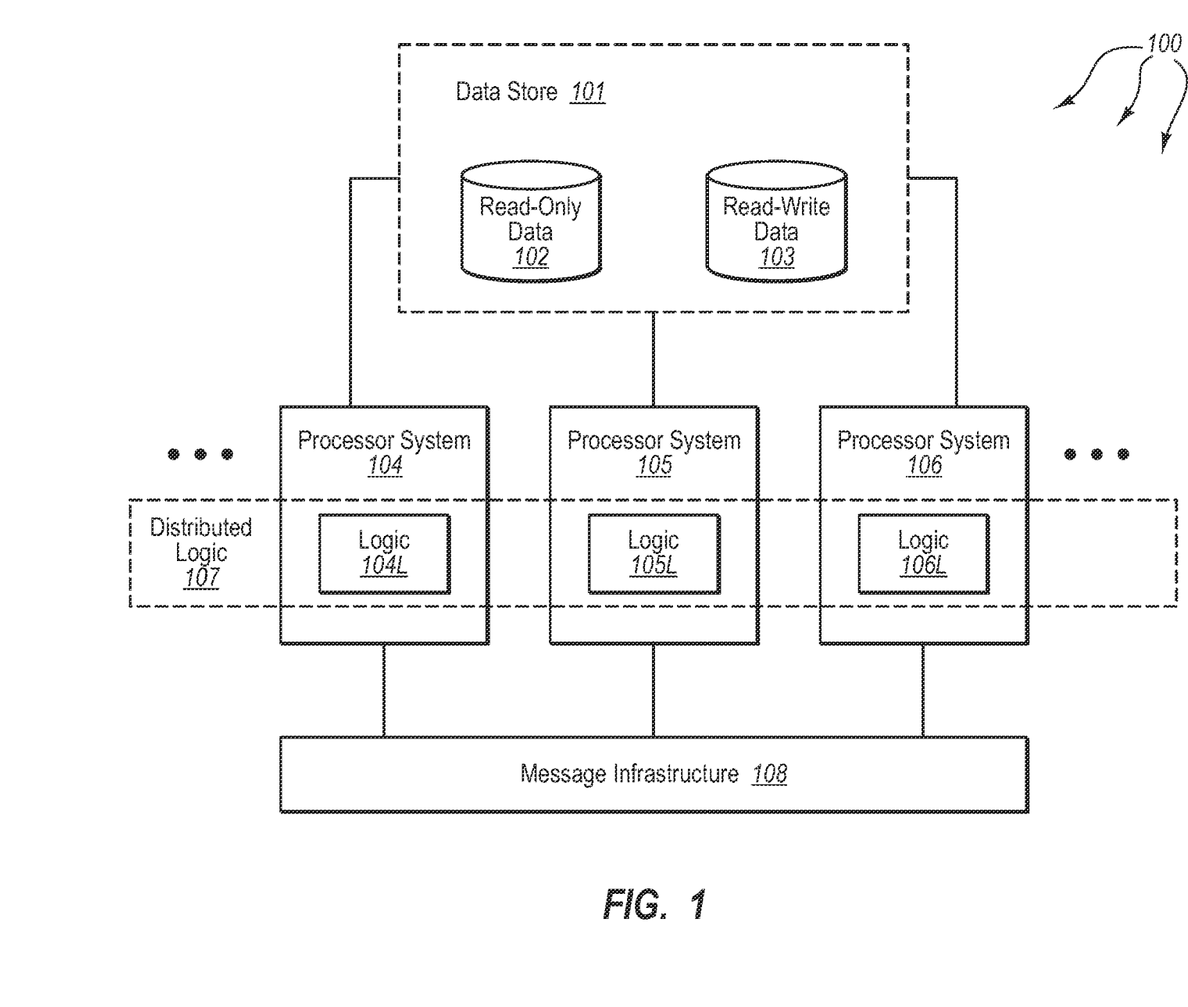
FIG. 1 illustrates an example computer architecture that facilitates distributed behavior controlled execution of modeled applications.

FIG. 1 illustrates an example computer architecture 100 that facilitates distributed behavior controlled execution of modeled applications. Depicted in computer architecture 100 are data store 101, processing systems 104, 105, and 106, and message infrastructure 108. Each of the depicted components can be connected to one another over a network, such as, for example, a Local Area Network ("LAN"), a Wide Area Network ("WAN"), and even the Internet. Accordingly, data store 101, processing systems 104, 105, and 106, and message infrastructure 108, as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Processing systems 104, 105, and 106 include logic 104L, 105L, and 106L respectively. Collectively logic 104L, 105L, and 106L represent distributed logic 107. Distributed logic 107 is configurable for executing distributed software applications that are distributed across processing systems 104, 105, and 106.

Data store 101 is connected to and shared among distributed logic 107. As depicted, data store 101 includes read-only data 102 and read-write data 103. Read-only data 102 may be data that is initially written to data store (write once) and then is read-only after the initial write. Read-only data can prescribe the behavior of distributed logic 107 when executing distributed software applications. Processing systems 104, 105, and 106 (as well as contained logic 104L, 105L and 106L respectively) can use read-write data 103 to store and share distributed software application data when executing a distributed software application.

A series of three periods (an ellipsis) to the left of processing system 104 and to the right of processing system 106 represents that other processing systems can be included in computer architecture 100. These other processing systems can contribute logic to distributed logic 107.

Message infrastructure 108 is connected to and shared among distributed logic 107. Message infrastructure 108 is configured to exchange messages among processing systems 104, 105, and 106. Message infrastructure 108 can be used to discover the presence of configurable distributed logic, such as, for example, logic 104L, 105L, and 106L, at processing systems 104, 105, and 106 for use in executing distributed applications. Message infrastructure 108 can also be used to coordinate processing systems 104, 105, and 106 to implement the behavior prescribed in read-only data 102 when executing a distributed application. In some embodiments, message infrastructure 108 is a peer-to-peer discovery and messaging (signaling) infrastructure.

Accordingly, embodiments of the invention facilitate the interoperation of a central data store along with various peer-to-peer functionalities. Thus, distributed applications can be executed in an environment that utilizes advantages of both a central data store and peer-to-peer messaging. The read-only portion of a centralized data store can be used to provide some behavior control over various processing systems during execution of a distributed software application.

Figure 2:
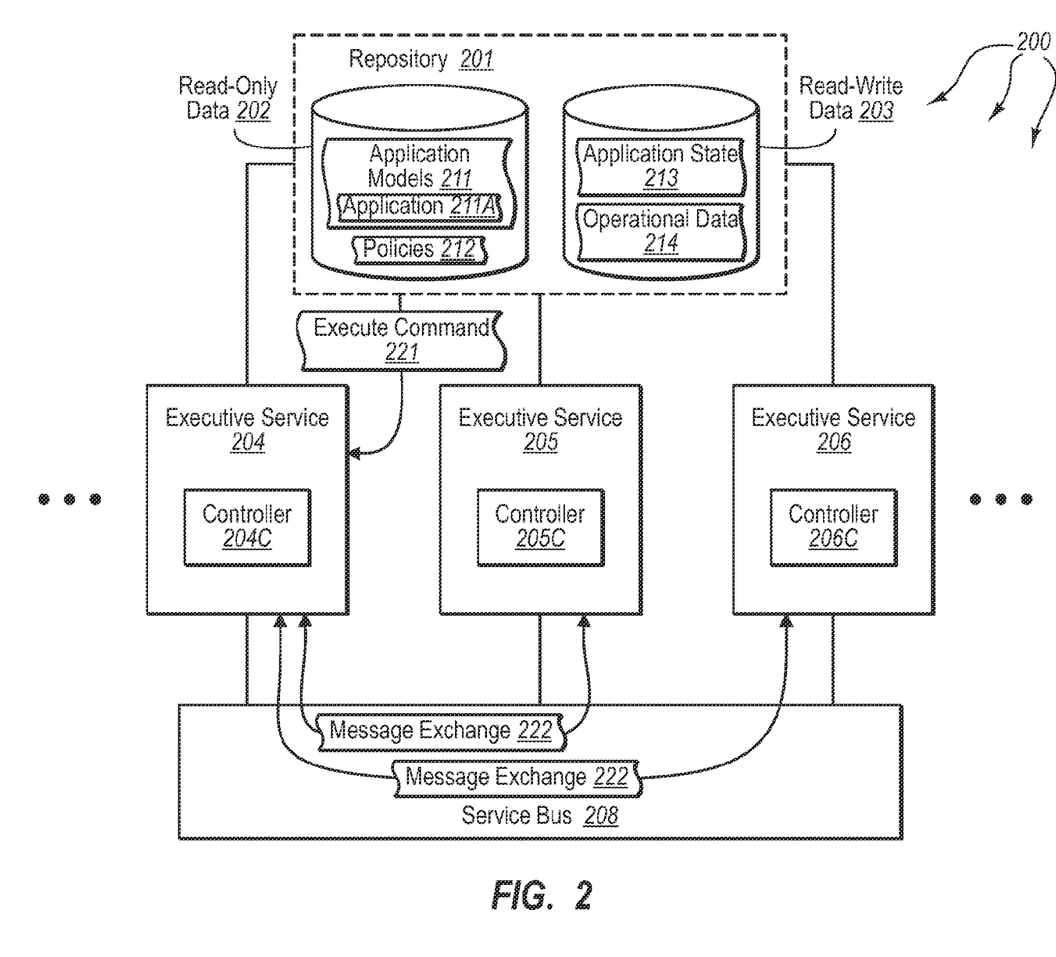
FIG. 2 illustrates an example computer architecture that facilitates executing an application across distributed execution logic in accordance with behavior execution policies.

FIG. 2 illustrates an example computer architecture 200 that facilitates executing an application across distributed execution logic in accordance with behavior execution policies. Depicted in computer architecture 200 are repository 201, executive services 204, 205, and 206, and service bus 208. Each of the depicted components can be connected to one another over a network, such as, for example, a Local Area Network ("LAN"), a Wide Area Network ("WAN"), and even the Internet. Accordingly, repository 201, executive services 204, 205, and 206, and service bus 208, as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Executive services 204, 205, and 206 can be dispersed across the network. Executive services 204, 205, and 206 are responsible for running and managing distributed applications. A series of three periods (an ellipsis) to the left of executive service 204 and to the right of executive service 206 represents that other executive services can be included in computer architecture 200.

Repository 201 includes read-only (or write once) data 202 and read-write data 203. Read-only data 202 further includes application models 211 and policies 212. Application models 211 and policies 212 are shared among executive services, such as, for example, executive services 204, 205, and 206. Policies 212 are declarative statements defining the collective behavior of executive services. For example, a policy can define a maximum number of messages (e.g., twenty) that are permitted to be sent from an executive service per second.

Accordingly, each executive service in computer architecture 200 interprets and complies with policies 212. Executive services can be permitted some freedom in local behavior as defined in policies 212. For example, executive services can be permitted to perform local error recovery, such as, for example, restarting a process. However, other more serious and/or complex errors, such as, for example, disk failure, may impact multiple executive services for appropriate recovery (e.g., redeployment of application components). Thus, recovery from these more serious and/or complex errors can include collective behavior of a number of executive services. Accordingly, an individual executive service can be prohibited from initiating recovery for these more serious and/or complex errors.

Application models 211 include application models that can be consumed by a collective of executive services to implement a distributed application. For example, an application model can be a declarative program run and managed by a collection of executive services.

Read-write data 203 further includes application state 213 and operational data 214. Application state 213 can reflect the state of distributed application (e.g., an application model form application models 211), such as, for example, configured, deployed, running, etc. Operational data 214 can include information, such as, for example, run time metrics, used to determine compliance with policies 212. For example, operational data 214 can include an indication of how many messages an executive service is sending per second. An executive service can write operational data into operational data 214 based on runtime behavior of distributed applications.

Executive services can use service bus 208 (e.g., a peer-to-peer fabric, such as, for example, a distributed publish/subscribe infrastructure) to discover each other and implement cooperative behavior. Service bus 208 can include a transitively federated namespace service (permitting executive services to federate with one another) and a message bus. For example, through communication via service bus 208, executive services 204, 205, and 206 can collectively form a cluster to host a Web site as indicated in a model of a distributed application (e.g., contained in application models 211).

Other cooperative behavior can be implemented when a catastrophic failure of one executive service occurs. One or more healthy "buddy" executive services can signal one another via service bus 208 and select another executive service (e.g., through a vote) to take over and recover from the error.

As depicted, executive services 204, 205, and 206 include controllers 204C, 205C, and 206C respectively. Generally, controllers interpret policies (e.g., polices 212) and enforce cooperative behavior among executive services. For example, controllers can enforce looking after "buddy" executive services and enforce suppressing negative local behavior, such as, for example, attempting to shut down a local service (e.g., Internet Information Services ("IIS") or SQL server) that contains part of a running distributed application.

Thus, embodiments of the invention include environments where every executive service has the same view on policies and application models and can discover and signal other executive services. Accordingly, it is possible to interact with one executive service to operate a collective group of (or all of the) executive services in an environment, such as, for example, computer architecture 200.

Figure 3:
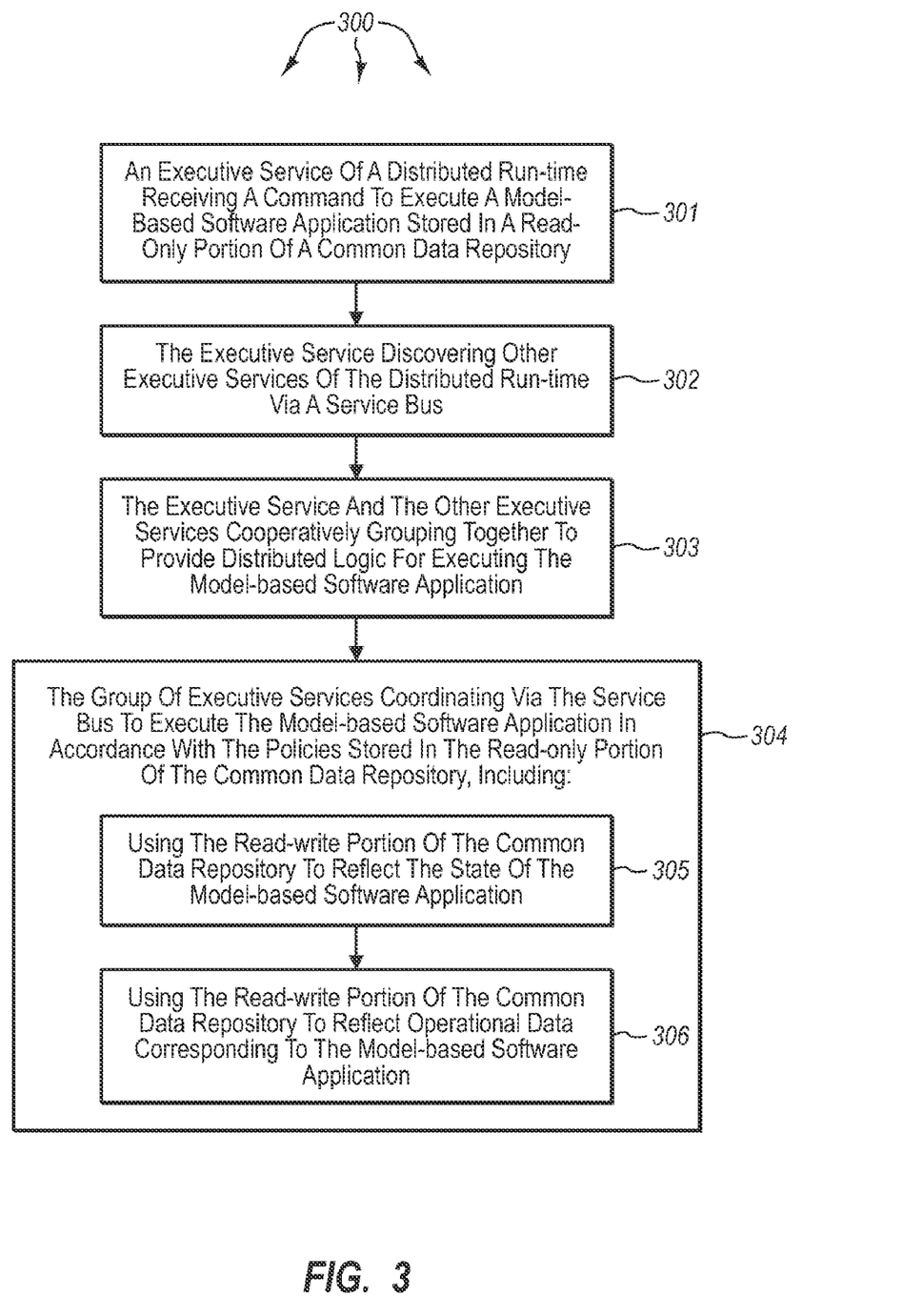
FIG. 3 illustrates a flow chart of an example method for executing an application across distributed execution logic in accordance with behavior execution policies.

FIG. 3 illustrates a flow chart of an example method 300 for executing an application across distributed execution logic in accordance with behavior execution policies. The method 300 will be described with respect to the components and data in computer architecture 200.

Method 300 includes an act of an executive service of a distributed run-time receiving a command to execute a model-based software application stored in the read-only portion of a common data repository (act 301). For example, executive service 204 can receive execute command 221 to execute application 211A.

Method 300 includes an act of executive service discovering other executive services of the distributed run-time via the service bus (act 302). For example, executive service 204 can discover executive services 205 and 206 though message exchanges 222 and 223 respectively, via service bus 208.

Method 300 includes an act of the executive service and the other executive services cooperatively grouping together to provide distributed logic for executing the model-based software application (act 303). For example, executive service 204 and executive services 205 and 206 can cooperatively group together (e.g., in accordance with policies 212) to provide distributed logic for executing application 211A.

Method 300 includes an act of the group of executive services coordinating via the service bus to execute the model-based software application in accordance with the policies stored in the read-only portion of the common data repository (act 304). For example, the group of executive services 204, 205, and 206 can coordinate via service bus 208 to execute application 211A in accordance with polices 212.

Coordinating via the service bus to execute the model-based software application in accordance with the policies includes an act of using the read-write portion of the common data repository to reflect the state of the model-based software application (act 305). For example, executive services 204, 205, and 206 can write data to and read data from application state 213 to reflect the state (e.g., configured, deployed, running, etc.) of application 211.

Coordinating via the service bus to execute the model-based software application in accordance with the policies includes an act of using the read-write portion of the common data repository to reflect operational data corresponding to the model-based software application (act 306). For example, executive services 204, 205, and 206 can write data to and read data from operational data 214 to reflect runtime metrics (e.g., average response time, messages per second, etc.) corresponding to application 211. The run time metrics can be used to determine compliance with polices 212.

Thus, embodiments of the invention can be used to form a policy-driven collective of nodes forming a distributed, decentralized run-time for model-based applications. Controllers at each node can enforce policies and coordinate with other nodes. Utilizing a cooperating collective of nodes that comply with centralized polices and execute applications over a peer-to-peer fabric permits a distributed application runtime to accommodate distribution and decentralization on a large scale. For example, a large scale WAN or even the Internet can be viewed as a data center.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A distributed computing system configured to centrally control the distributed execution of a model-based distributed software application executing across a plurality of peer-peer connected processing systems, the distributed computing system comprising:
   a plurality of processing systems that are connected in a peer-to-peer network and that are configured to interoperate to execute the model-based distributed software application across the plurality of peer-to-peer processing systems, each of the plurality of peer-to-peer processing systems including:
      a portion of distributed logic, the portion of distributed logic configured to execute a portion of the model-based distributed software application; and
      at least one processor operatively coupled a system memory and one or more computer storage devices having stored thereon computer-executable instructions that, when executed by the at least one processor, implement a controller, the controller configured to:
         enforce centrally defined policies that prescribe and limit behavior of the processing system during the distributed execution of the model-based distributed software application across the plurality of peer-to-peer processing systems; and
         coordinate interoperation with other processing systems in the peer-to-peer network to execute the model-based distributed software application in accordance with the centrally defined policies, including utilizing collective behavior of the plurality of processing systems to recover from any of one or more errors during the distributed execution of the model-based distributed software application in accordance with the centrally defined policies, and prohibiting at least one of the plurality of processing systems from initiating error recovery for certain predefined errors;
   a data store connected to and shared among each of the peer-to-peer processing systems, the data store including:
      read-only policy data, the read-only policy data centrally defining application specific policies that each portion of distributed logic is to comply with during the distributed execution of the model-based distributed software application, the read-only policy data prescribing and limiting behavior that peer-to-peer processing systems can exhibit individually and cooperatively during the distributed execution of the model-based distributed software application; and
      read-write application data, the plurality of peer-to-peer processing systems using the read-write application data to store and share distributed software application data during the distributed execution of the model-based distributed software application, the read-write application data comprising run time metrics used to determine compliance with prescribed behavior indicated in the read-only policy data; and
   a message infrastructure connected to and shared among the distributed logic, the message infrastructure configured to exchange messages among the peer-to-peer processing systems to:
      discover the presence of portions of distributed logic at the peer-to-peer processing systems for use in executing the model-based distributed software application; and
      interoperate with the controllers at the peer-to-peer processing systems to prescribe and limit the behavior of the peer-to-peer processing systems for compliance with the centrally defined policies when executing the model-based distributed software application.

2. The distributed computing system as recited in claim 1, wherein the plurality of peer-to-peer processing systems form a distributed, decentralized run-time for model-based distributed software applications.

3. The distributed computing system as recited in claim 1, further comprising second read-only data describing one or more model-based distributed software applications configured for distributed execution by the distributed logic.

4. The distributed computing system as recited in claim 1, wherein the read-write data comprises data used to describe the application state of a distributed application, wherein the application state is selected from among configured, deployed, and running.

5. The distributed computing system as recited in claim 1, wherein the message infrastructure is a distributed publish subscribe infrastructure.

6. The distributed computing system as recited in claim 1, wherein each of the a plurality of processing systems implements a peer-to-peer executive service.

7. A method for executing a model-based distributed software application in a distributed processing system, the distributed processing system including: (i) a plurality of decentralized processing systems that are connected in a peer-to-peer network and that each use at least one processor operatively coupled to system memory to implement a group of peer-to-peer executive services collectively representing a distributed run-time, each peer-to-peer executive service including distributed logic for executing the model-based distributed software application across the group of peer-to-peer executive services; (ii) a common data repository shared by each of the peer-to-peer processing systems and having a read-only portion and a read-write portion, the read-only portion storing one or more model-based distributed software applications and storing centrally defined policies that each peer-to-peer executive service is to comply with during the distributed execution of the model-based distributed software application, the centrally defined policies prescribing and limiting individual and cooperative behavior of the peer-to-peer executive services when executing the model-based distributed software application, the read-write portion usable by the peer-to-peer executive services to maintain application state and application operational data; and (iii) a service bus, the peer-to-peer executive services using the service bus to discover and cooperatively communicate with one another to execute the model-based distributed software application, the method comprising:

an act of a peer-to-peer executive service of the distributed run-time receiving a command to execute a model-based distributed software application stored in the read-only portion of the common data repository, wherein the peer-to-peer executive service is implemented at a processing system that includes at least one processor;

an act of the peer-to-peer executive service discovering other peer-to-peer executive services of the distributed run-time via the service bus, the peer-to-peer executive service and each of the other peer-to-peer executive services distributed across the plurality of decentralized peer-to-peer processing systems;

an act of the peer-to-peer executive service and the other peer-to-peer executive services referring to the centrally defined policies to cooperatively group together to provide distributed logic across the plurality of decentralized processing systems for executing the model-based distributed software application in accordance with the centrally defined polices;

an act of the group of peer-to-peer executive services coordinating via the service bus to execute the model-based distributed software application across the decentralized peer-to-peer processing systems in accordance with the centrally defined policies, executing the model-based distributed software application across the plurality of decentralized peer-to-peer processing systems including prescribing and limiting the individual and cooperative behavior of the group of peer-to-peer executive services in accordance with the centrally defined policies, including:

an act of using the read-write portion of the common data repository to reflect the application state of the model-based distributed software application;

an act of using the read-write portion of the common data repository to reflect operational data corresponding to the model-based distributed software application, including using the read-write portion of the common data repository to maintain runtime metrics that can be evaluated to determine if peer-to-peer executive services are complying with the centrally defined polices; and an act of utilizing collective behavior of the group of peer-to-peer executive services to recover from any of one or more errors during the distributed execution of the model-based distributed software application in accordance with the centrally defined policies, and prohibiting at least one of the peer-to-peer executive services from initiating error recovery for certain predefined errors.

8. The method as recited in claim 7, wherein the act of the group of peer-to-peer executive services coordinating via the service bus to execute the model-based distributed software application comprises an act of a controller at each peer-to-peer executive service monitoring the behavior of the executive service for compliance with the policies.

9. The method as recited in claim 7, wherein the act of the group of peer-to-peer executive services coordinating via the service bus to execute the model-based distributed software application comprises utilizing the policies to suppress local behavior at a peer-to-peer executive service that negatively affects the distributed execution of the model-based distributed software application at one or more other peer-to-peer executive services.

10. One or more computer storage device for use in a distributed processing system, the distributed processing system including: (i) a plurality of decentralized processing systems that are connected in a peer-to-peer network and that each use at least one processor operatively coupled to system memory to execute computer-executable instructions that implement a group of peer-to-peer executive services collectively representing a distributed run-time, each peer-to-peer executive service including distributed logic for executing the model-based distributed software application across the group of peer-to-peer executive services; (ii) a common data repository shared by each of the peer-to-peer processing systems and having a read-only portion and a read-write portion, the read-only portion storing one or more model-based distributed software applications and storing centrally defined policies that each peer-to-peer executive service is to comply with during the distributed execution of the model-based distributed software application, the centrally defined policies prescribing and limiting the individual and cooperative behavior of the peer-to-peer executive services when executing the model-based distributed software application, the read-write portion usable by the peer-to-peer executive services to maintain application state and application operational data; and (iii) a service bus, the peer-to-peer executive services using the service bus to discover and cooperatively communicate with one another to execute the model-based distributed software applications, the computer program product for implementing a method for executing a model-based distributed software application in the distributed computing system, the one or more computer storage device having stored thereon computer-executable instructions that, when executed, cause a peer-to-peer executive service of the distributed processing system to perform the method, including the following:

receive, at a peer-to-peer executive service, a command to execute a model-based distributed software application stored in the read-only portion of the common data repository, wherein the peer-to-peer executive service is implemented at a processing system that includes at least one processor;

discover other peer-to-peer executive services of the distributed run-time via the service bus, the peer-to-peer executive service and each of the other peer-to-peer executive services distributed across the plurality of decentralized peer-to-peer processing systems;

refer to the centrally defined polices to cooperatively group together with the other executive services to provide distributed logic across the plurality of decentralized processing systems for executing the model-based distributed software application in accordance with the centrally defined polices;

coordinate via the service bus to execute the model-based distributed software application across the plurality of decentralized peer-to-peer processing systems in accordance with the centrally defined policies, executing the model-based distributed software application across the decentralized peer-to-peer processing systems including prescribing and limiting the individual and cooperative behavior of the group of peer-to-peer executive services in accordance with the centrally defined policies, including:

using the read-write portion of the common data repository to reflect the application state of the model-based distributed software application;

using the read-write portion of the common data repository to reflect operational data corresponding to the model-based distributed software application, including using the read-write portion of the common data repository to maintain runtime metrics that can be evaluated to determine if peer-to-peer executive services are complying with the centrally defined polices; and utilizing collective behavior of the group of peer-to-peer executive services to recover from any of one or more errors during the distributed execution of the model-based distributed software application in accordance with the centrally defined policies, and prohibiting at least one of the peer-to-peer executive services from initiating error recovery for certain predefined errors.

11. The one or more computer storage device as recited in claim 10, wherein the computer-executable instructions that, when executed, cause a peer-to-peer executive service to coordinate via the service bus to execute the model-based distributed software application across the decentralized processing systems comprise computer-executable instructions that, when executed, monitor the behavior of the peer-to-peer executive service for compliance with the centrally defined policies.

12. The one or more computer storage device as recited in claim 10, wherein the computer-executable instructions that, when executed, cause a peer-to-peer executive service to coordinate via the service bus to execute the model-based distributed software application across the decentralized processing systems comprise computer-executable instructions that, when executed, cause the peer-to-peer executive service to utilize the policies to suppress local behavior at another peer-to-peer executive service that negatively affects the distributed execution of the model-based distributed software application at one or more other peer-to-peer executive services.

* * * * *